(12) United States Patent
Fukunishi

(10) Patent No.: US 8,711,402 B2
(45) Date of Patent: Apr. 29, 2014

(54) PRINTING APPARATUS HAVING EXTENDABLE FUNCTIONALITY AND METHOD THEREOF

(75) Inventor: Shigeki Fukunishi, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 920 days.

(21) Appl. No.: 12/801,197

(22) Filed: May 27, 2010

(65) Prior Publication Data

US 2010/0315662 A1    Dec. 16, 2010

(30) Foreign Application Priority Data

Jun. 10, 2009  (JP) .................................. 2009-139572

(51) Int. Cl.
*G06F 3/12*    (2006.01)

(52) U.S. Cl.
USPC ........................................................ 358/1.15

(58) Field of Classification Search
CPC .... G06G 13/126; G06F 3/1285; G06F 3/1296
USPC ........... 358/1.13, 1.15, 1.16, 1.18, 1.9; 713/1; 719/321
See application file for complete search history.

(56) References Cited

U.S. PATENT DOCUMENTS

| | | | |
|---|---|---|---|
| 8,081,338 B2 | 12/2011 | Kimura | |
| 8,373,889 B2 * | 2/2013 | Arai | 358/1.18 |
| 2006/0215221 A1 * | 9/2006 | Suzuki et al. | 358/1.15 |

FOREIGN PATENT DOCUMENTS

| | | |
|---|---|---|
| JP | 11-212742 | 8/1999 |
| JP | 2005-173701 | 6/2005 |
| JP | 3-745344 | 12/2005 |
| JP | 2006-260356 | 9/2006 |
| JP | 2006-261970 | 9/2006 |
| JP | 2007-323207 | 12/2007 |
| JP | 2008-282117 | 11/2008 |

OTHER PUBLICATIONS

Abstract of JP 2004-005608 published on Jan. 8, 2004.
Office Action for corresponding Japanese patent application No. 2009-139572 dated Mar. 12, 2013.

* cited by examiner

*Primary Examiner* — Benny Q Tieu
*Assistant Examiner* — Sunil Chacko
(74) *Attorney, Agent, or Firm* — Harness, Dickey & Pierce, P.L.C.

(57) ABSTRACT

A receiving unit 210 receives, from a PC 10, a print command that includes image data to be printed, an additional print parameter that is a print parameter of a function added to a printer driver of the PC 10 by installing a driver plug-in, and first identification information that is identification information on the driver plug-in; an identification-information storage unit 224 stores therein second identification information that is identification information on an installed main body plug-in; a determining unit 242 determines whether the main body plug-in can interpret the additional print parameter by comparing the first identification information with the second identification information; and a print unit performs a particular operation other than printing of the image data in accordance with the additional print parameter if it is determined that the additional print parameter cannot be interpreted.

9 Claims, 9 Drawing Sheets

FIG. 3

@PJL SET PAPERSOURCE = TRAY1
@PJL SET COPIES = 1

FIG. 4

```
<parameters>
    <parameter name = "WATERMARK" type = "pickone">
        <value name = "ON">
            <JDL command = "@PJL SET WATERMARKPLUGIN = 1234" />
            <JDL command = "@PJL SET WATERMARK = ON" />
        </value>
        <value name = "OFF" />
    </parameter>
</parameters>
```

```
         .
         .
         .
@PJL SET PAPERSOURCE = TRAY1
@PJL SET COPIES = 1
@PJL SET WATERMARKPLUGIN = 1234
@PJL SET WATERMARK = ON
         .
         .
         .
```

FIG. 7

```
<parameters>
    <parameter name = "PAPERSOURCE" default = "TRAY1">
        <value name = "TRAY1"/>
    </parameter>
    <parameter name = "COPIES" default = "1">
        <value range = "1-999"/>
    </parameter>
    <parameter name = "WATERMARK" default = "OFF">
        <value name = "ON"/>
        <value name = "OFF"/>
    </parameter>
</parameters>
```

FIG. 8

| KEY INFORMATION | DEFAULT VALUE |
|---|---|
| PAPERSOURCE | TRAY1 |
| COPIES | 1 |
| WATERMARK | OFF |

FIG. 9

```
<parameters>
    <parameter name = "WATERMARK" default = "OFF">
        <value name = "ON"/>
        <value name = "OFF"/>
    </parameter>
</parameters>
```

FIG. 11

```
<parameters>
    <parameter name = "PAPERSOURCE" default = "TRAY1">
        <value name = "TRAY1"/>
    </parameter>
    <parameter name = "COPIES" default = "1">
        <value range = "1-999"/>
    </parameter>
</parameters>
```

FIG. 12

| KEY INFORMATION | DEFAULT VALUE |
|---|---|
| PAPERSOURCE | TRAY1 |
| COPIES | 1 |

PRINTING APPARATUS HAVING EXTENDABLE FUNCTIONALITY AND METHOD THEREOF

CROSS-REFERENCE TO RELATED APPLICATIONS

The present application claims priority to and incorporates by reference the entire contents of Japanese Patent Application No. 2009-139572 filed in Japan on Jun. 10, 2009.

BACKGROUND OF THE INVENTION

1. Field of the Invention

The present invention relates to a printing apparatus and a printing method.

2. Description of the Related Art

A conventional technology for extending the functionality of a printing apparatus, such as a printer, by installing a plug-in is known. A technology is also known for extending the functionality of a printer driver installed in an information processing apparatus, such as a Personal Computer (PC), from which a print request is issued, by installing a plug-in so as to make the extended functionality of a printing apparatus usable.

In order to print image data using the extended functionality in a print system that includes such a printing apparatus and such an information processing apparatus, a plug-in installed in the printing apparatus needs to be compatible with a plug-in installed in a printer driver.

For example, Japanese Patent Application Laid-open No. 2006-260356 discloses a technology for checking compatibility by performing two-way communication with an MFP before printing is performed so as to receive the version of the plug-in of the MFP and then by comparing the version of the plug-in of the MFP with the version of the plug-in of the printer driver installed in the PC.

According to the conventional technology described above, if two-way communication cannot be performed between the printing apparatus and the information processing apparatus, the compatibility of plug-ins cannot be checked.

SUMMARY OF THE INVENTION

It is an object of the present invention to at least partially solve the problems in the conventional technology.

According to an aspect of the present invention, there is provided a printing apparatus, the printing apparatus including a receiving unit that receives, from an information processing apparatus, a print command that includes image data to be printed, an additional print parameter that is a print parameter of a function added to a printer driver of the information processing apparatus by installing a first plug-in, and first identification information that is identification information on the first plug-in, an identification-information storage unit that stores therein second identification information that is identification information on an installed second plug-in, a determining unit that determines whether the second plug-in can interpret the additional print parameter by comparing the first identification information with the second identification information, and a print unit that, if it is determined that the additional print parameter cannot be interpreted, performs a particular operation other than printing of the image data in accordance with the additional print parameter.

According to another aspect of the present invention, there is provided a printing method, the printing method including receiving, by a receiving unit, from an information processing apparatus, a print command that includes image data to be printed, an additional print parameter that is a print parameter of a function added to a printer driver of the information processing apparatus by installing a first plug-in, and first identification information that is identification information on the first plug-in, determining, by a determining unit, whether the second plug-in can interpret the additional print parameter by comparing the first identification information with second identification information that is identification information on an installed second plug-in and stored in an identification-information storage unit, and performing, by a print unit, a particular operation other than printing of the image data in accordance with the additional print parameter if it is determined that the additional print parameter cannot be interpreted.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a figure that illustrates an example of JDL commands generated by a graphic driver according to the present embodiment;

FIG. 4 is a figure that illustrates an example of a generation rule;

FIG. 7 is a figure that illustrates an example of a print parameter rule;

FIG. 8 is a table that illustrates an example of a print parameter table;

FIG. 9 is a figure that illustrates an example of an additional print-parameter rule for an installed main body plug-in;

FIG. 11 is a figure that illustrates a print parameter rule stored in a print-parameter rule storage unit before the update process is performed;

FIG. 12 is a table that illustrates a print parameter table stored in a print-parameter table storage unit before the update process is performed;

DETAILED DESCRIPTION OF THE PREFERRED EMBODIMENTS

Embodiments of a printing apparatus and a printing method according to the present invention are explained in detail below with reference to the accompanying drawings. Although an explanation is given in the following embodiment using a printer as an example of the printing apparatus, the present invention is not limited thereto. For example, the printing apparatus may be a multifunction product (MFP: Multifunction Printer), or the like, that has at least any one of copy, scanner, and facsimile functions in addition to a printer function.

First, an explanation is given of the configuration of a printer system that includes a printer according to the present embodiment.

Figure 1:
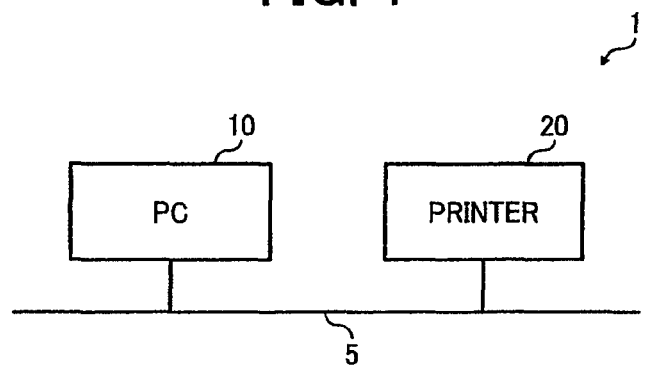
FIG. 1 is a block diagram that illustrates an example of the configuration of a printer system according to the present embodiment.

FIG. 1 is a block diagram that illustrates an example of the configuration of a printer system 1 according to the present embodiment. As illustrated in FIG. 1, the printer system 1 includes a Personal Computer (PC) 10 (an example of an information processing apparatus), from which a print request is issued, and a printer 20 that performs printing in response to a print request received from the PC 10, and these apparatuses are coupled to each other via a network 5.

The printer system 1 may include a plurality of PCs 10 or include a plurality of printers 20. The network 5 may be any type of network, a wired or wireless network, a Local Area Network (LAN), or a public network. The PC 10 and the printer 20 may be coupled to each other via a Universal Serial Bus (USB) cable.

Figure 2:
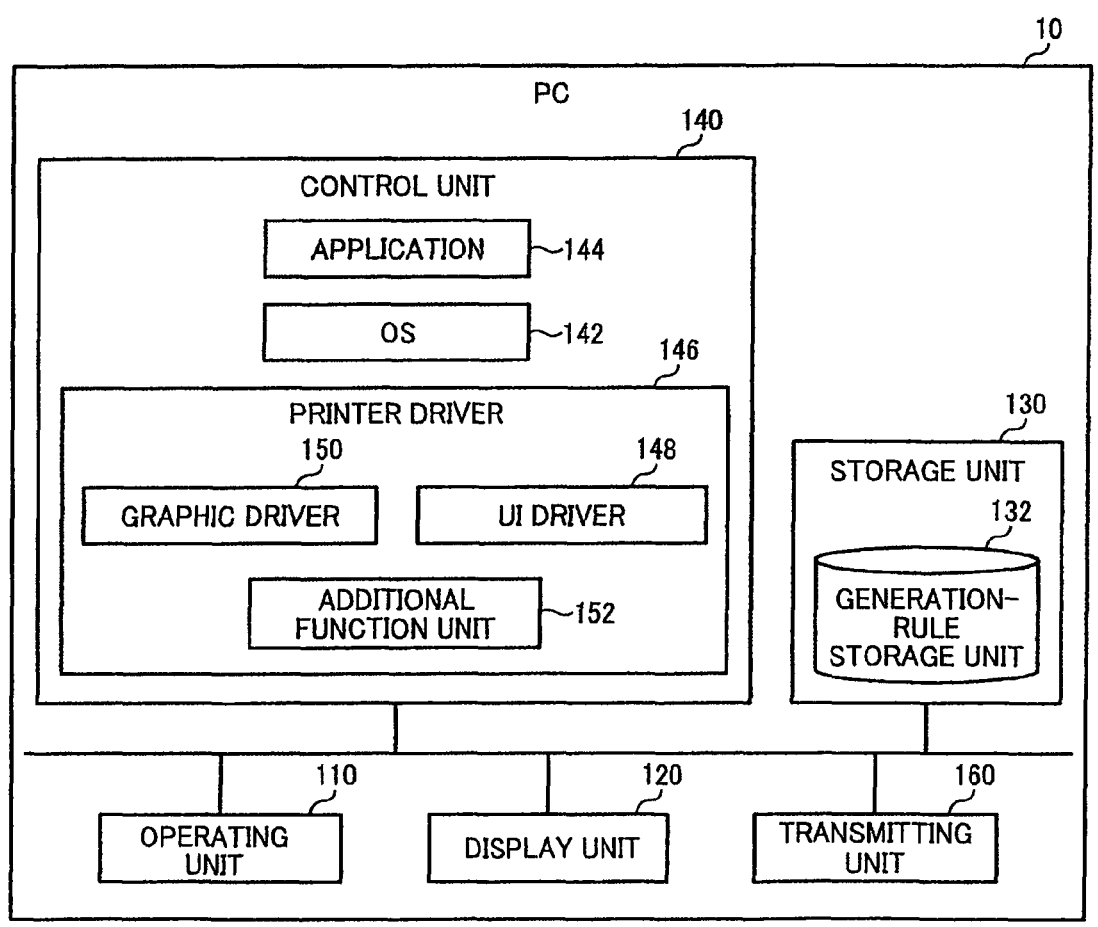
FIG. 2 is a block diagram that illustrates an example of the configuration of a PC according to the present embodiment.

FIG. 2 is a block diagram that illustrates an example of the configuration of the PC 10 according to the present embodiment. As illustrated in FIG. 2, the PC 10 includes an operating unit 110, a display unit 120, a storage unit 130, a control unit 140, and a transmitting unit 160.

The operating unit 110 performs input for various operations and can be implemented by an existing input device, such as a keyboard, a mouse, a touch-pad, or a touch panel.

The display unit 120 displays various menu screens, such as a print setting screen for specifying print settings, an application operation screen, and the like, and can be implemented by an existing display device, such as a liquid crystal display or a touch panel display.

The storage unit 130 stores therein various programs to be executed by the PC 10, various types of information to be used for various processes performed by the PC 10, and the like, and can be implemented by an existing storage device, for example, a Hard Disk Drive (HDD), a Solid State Drive (SSD), a memory card, an optical disk, a Read Only Memory (ROM), a Random Access Memory (RAM), or the like, that can store data magnetically, optically, or electrically. The storage unit 130 includes a generation-rule storage unit 132. The details of the generation-rule storage unit 132 are described later.

The control unit 140 controls the entire PC 10 and can be implemented by a Central Processing Unit (CPU). The control unit 140 includes an OS 142, an application 144, and a printer driver 146. An OS program, an application program, and a printer driver program stored in the storage unit 130 are run (executed) by the control unit 140 so that the OS 142, the application 144, and the printer driver 146 are implemented.

The OS 142 controls each unit of the PC 10 (specifically, hardware and software of the PC 10) and can be implemented by basic software, for example, Windows (registered trademark), UNIX (registered trademark), or the like.

The application 144 allows a predetermined operation, such as document creation, document browsing, or numerical calculation, to be performed by the PC 10 and can be implemented by, for example, word-processing software, browsing software, spreadsheet software, or the like operated by the basic software. The application 144 receives, from the operating unit 110, an operation input for ordering display of a print setting screen or an operation input for ordering printing of image data and notifies the printer driver 146, which is explained later, via the OS 142 accordingly.

The printer driver 146 allows the printer 20 to be operated via the PC 10 and can be implemented by software to absorb difference between the OS 142 and the printer 20. The printer driver 146 includes a UI driver 148, a graphic driver 150, and an additional function unit 152.

The printer driver 146 according to the present embodiment allows addition (extension) of functionality by installation of a driver plug-in (an example of a first plug-in), which is a plug-in for driver extension, and the additional function unit 152 is implemented by installing the driver plug-in. Specifically, a driver plug-in program, which is stored in the storage unit 130 by installing the driver plug-in, is run (executed) by the control unit 140 together with a printer driver program so that the additional function unit 152 is implemented as part of the printer driver 146.

The UI driver 148 receives an order to display a print setting screen from the application 144 via the OS 142 and displays the print setting screen on the display unit 120. Print settings are set on the print setting screen in accordance with an operation input from the operating unit 110.

Print settings of a standard function that is a function originally belonging to the printer driver 146 can be set on the print setting screen and, for example, a feed tray, the number of print copies, or the like can be set. According to the present embodiment, because the additional function unit 152 is implemented as part of the printer driver 146 by installing a driver plug-in, print settings of an additional function (a function added to the printer driver 146) that is a function of the additional function unit 152 can be also set on the print setting screen. For example, if a function of the additional function unit 152 is electronic watermarking, the presence or absence of an electronic watermark, or the like can be also set.

The UI driver 148 returns print parameters (for example, a setting for a feed tray, a setting for the number of print copies, the presence or absence of use of an electronic watermark, or the like) indicating the print settings set on the print setting screen to the application 144 via the OS 142.

The graphic driver 150 receives image data to printed, a print parameter set by the UI driver 148, or the like, as well as a print instruction from the application 144 via the OS 142 and generates a Job Description Language (JDL) command, which is a print command interpretable by the printer 20, as well as the additional function unit 152 does.

Specifically, the graphic driver 150 generates JDL commands for image data to be printed and a standard print parameter that is a print parameter for a standard function. The graphic driver 150 instructs the additional function unit 152 to generate JDL commands for an additional print parameter that is a print parameter for an additional function and first identification information that is identification information on an installed driver plug-in.

Although an explanation is given in the present embodiment using a Printer Job Language (PJL) developed by the Hewlett-Packard (HP) Company as an example of a JDL, the present invention is not limited thereto and other JDLs can be used.

FIG. 3 is a figure that illustrates an example of JDL commands generated by the graphic driver 150. In the example illustrated in FIG. 3, the description of a JDL command for image data to be printed is omitted. In the example illustrated in FIG. 3, a standard print parameter includes standard key information indicating a standard function and the variable for the standard key information. For example, PAPERSOURCE is standard key information indicating a setting for a feed tray, and its variable is set to TRAY1 indicating tray 1. Further, COPIES is standard key information indicating a setting for the number of print copies, and its variable is set to 1, which indicates one copy.

Refer back to FIG. 2. The generation-rule storage Unit 132 stores therein a generation rule for a JDL command generated by the additional function unit 152.

FIG. 4 is a figure that illustrates an example of a generation rule. Although the generation rule is described in an Extensible Markup Language (XML) format in the example illustrated in FIG. 4, it may be described in other formats. WATERMARK is additional key information indicating an additional function and means an electronic watermark. Further, pickone is the variable indicating a possible value for WATERMARK, and it is indicated that WATERMARK can have any one of the values ON and OFF. It is indicated that, if the value of WATERMARK is ON, JDL commands, i.e., "@PJL SET WATERMARKPLUGIN=1234" and "@PJL SET WATERMARK=ON" are generated and, if the value of WATERMARK is OFF, a JDL command is not generated.

Refer back to FIG. 2. Upon receiving an instruction from the graphic driver 150, the additional function unit 152 generates JDL commands for the additional print parameter and the first identification information that is identification information on an installed driver plug-in. For example, if the additional print parameter notified by the graphic driver 150 indicates the use of an electronic watermark, the additional function unit 152 generates a JDL command in accordance with the generation rule illustrated in FIG. 4 and returns it to the graphic driver 150.

In the JDL command generated in accordance with the generation rule illustrated in FIG. 4, the first identification information is set to 1234. An additional print parameter includes additional key information indicating an additional function and the variable for the additional key information and, for example, WATERMARK is additional key information indicating an electronic watermark and its variable is set to ON, which indicates the use of an electronic watermark.

The graphic driver 150 then combines the JDL command generated by itself and the JDL command generated by the additional function unit 152 and causes the transmitting unit 160, which is explained later, to transmit the combined JDL command.

The transmitting unit 160 transmits information to an external device, such as the printer 20, via the network 5 and can be implemented by an existing communication device such as a communication interface. In particular, the transmitting unit 160 according to the present embodiment transmits a JDL command group combined by the graphic driver 150 as illustrated in FIG. 5 to the printer 20.

The PC 10 does not need to include all of the above-described units as fundamental units, and a configuration may be such that the PC 10 does not include some of them.

Figures 5, 6:
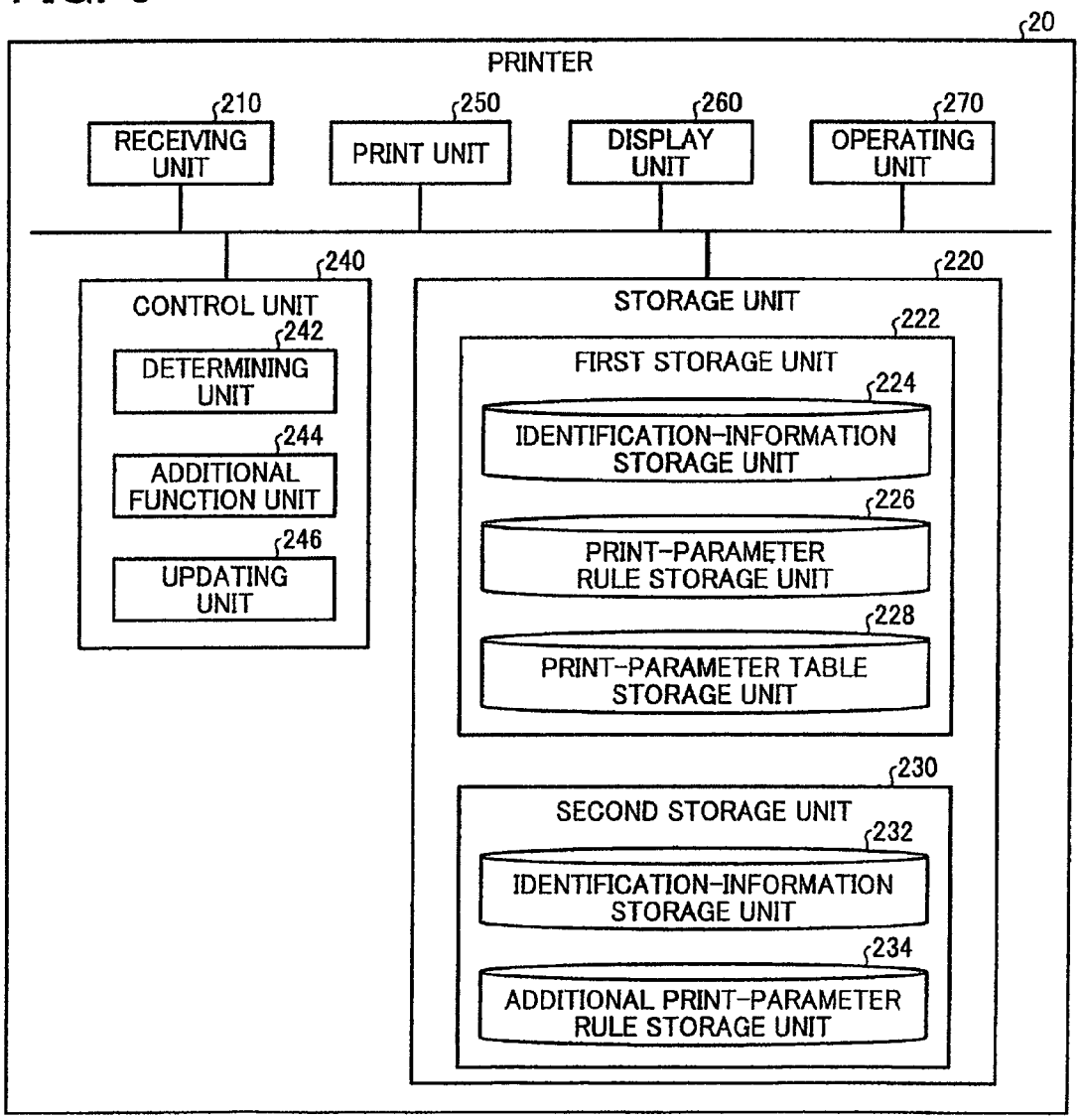
FIG. 5 is a figure that illustrates an example of JDL commands transmitted by a transmitting unit according to the present embodiment.
FIG. 6 is a block diagram that illustrates an example of the configuration of a printer according to the present embodiment.

FIG. 6 is a block diagram that illustrates an example of the configuration of the printer 20 according to the present embodiment. As illustrated in FIG. 6, the printer 20 includes a receiving unit 210, a storage unit 220, a control unit 240, a print unit 250, a display unit 260, and an operating unit 270.

The receiving unit 210 receives information from an external device, such as the PC 10, via the network 5, and can be implemented by an existing communication device, such as a communication interface. In particular, according to the present embodiment, the receiving unit 210 receives, from the PC 10, JDL commands that include image data to be printed, a standard print parameter, an additional print parameter, and first identification information, as illustrated in FIG. 5.

The storage unit 220 stores therein various programs to be executed by the printer 20, various types of information to be used for various processes performed by the printer 20, and the like, and can be implemented by an existing storage device, for example, a Hard Disk Drive (HDD), a Solid State Drive (SSD), a memory card, an optical disk, a Read Only Memory (ROM), a Random Access Memory (RAM), or the like, that can store data magnetically, optically, or electrically. The storage unit 220 includes a first storage unit 222 implemented by an internal storage device, such as a RAM, and a second storage unit 230 implemented by an external storage device, such as an HDD. The details of the first storage unit 222 and the second storage unit 230 are described later.

The control unit 240 controls the entire printer 20 and can be implemented by a Central Processing Unit (CPU), or the like. The control unit 240 includes a determining unit 242, an additional function unit 244, and an updating unit 246.

The printer 20 according to the present embodiment allows addition (extension) of functionality by installation of a main body plug-in (an example of a second plug-in), which is a plug-in for printer extension, and the additional function unit 244 is implemented by installing the main body plug-in. Specifically, a main body plug-in program, which is stored in the storage unit 220 by installing the main body plug-in, is run (executed) by the control unit 240 so that the additional function unit 244 is implemented. According to the present embodiment, an explanation is given using an example where a function added by the main body plug-in is electronic watermarking.

The first storage unit 222 includes an identification-information storage unit 224, a print-parameter rule storage unit 226, and a print-parameter table storage unit 228.

The identification-information storage unit 224 stores therein second identification information that is identification information on the installed main body plug-in. According to the present embodiment, the identification-information storage unit 224 stores therein 1234 as the second identification information.

The print-parameter rule storage unit 226 stores therein an additional print-parameter rule that defines the additional key information interpretable by the main body plug-in (the additional function unit 244), the possible value of the variable for the additional key information, and the default value for the additional key information. The print-parameter rule storage unit 226 further stores therein a standard print-parameter rule that defines the standard key information interpretable by the control unit 240 as a standard function, the possible value of the variable for the standard key information, and the default value for the standard key information.

FIG. 7 is a figure that illustrates an example of the standard print-parameter rule and the additional print-parameter rule. Although a print parameter rule is described in an Extensible Markup Language (XML) format in the example illustrated in FIG. 7, it maybe described in other formats.

In the example illustrated in FIG. 7, a print parameter rule for a feed tray is defined as a standard print-parameter rule, wherein it is indicated that the standard key information is PAPERSOURCE, the default value for the standard key information is TRAY1, and the only possible value of the variable for the standard key information is TRAY1.

Similarly, in the example illustrated in FIG. 7, a print parameter rule for the number of print copies is defined as a standard print-parameter rule, wherein it is indicated that the standard key information is COPIES, the default value for the standard key information is 1, and the possible values of the variable for the standard key information are 1 to 999.

Further, in the example illustrated in FIG. 7, a print parameter rule for an electronic watermark is defined as an additional print-parameter rule, wherein it is indicated that the additional key information is WATERMARK, the default value for the additional key information is OFF, and the possible value of the variable for the additional key information is ON or OFF.

Refer back to FIG. 6. The print-parameter table storage unit 228 stores therein an additional print-parameter table, in which additional key information and the default value for the additional key information are linked to each other, and also stores therein a standard print parameter table, in which standard key information and the default value for the standard key information are linked to each other.

FIG. 8 is a table that illustrates an example of the standard print parameter table and the additional print-parameter table. In the example illustrated in FIG. 8, the standard key information of the standard print-parameter rule illustrated in FIG. 7 and the default value for the standard key information are stored as a standard print parameter table such that the standard key information and the default value are linked to each other, and the additional key information of the additional print-parameter rule and the default value for the additional key information are stored as an additional print-parameter table such that the additional key information and the default value are linked to each other.

Refer back to FIG. 6. The determining unit 242 analyzes the contents of a JDL command received by the receiving unit 210 and determines whether a print parameter is interpretable, and the determining unit 242 can be implemented by a PJL parser, or the like.

The determining unit 242 compares the first identification information contained in the JDL command with the second identification information stored in the identification-information storage unit 224, thereby determining whether the main body plug-in (the additional function unit 244) can interpret an additional print parameter. Specifically, if the second identification information that matches the first identification information is not present in the identification-information storage unit 224, the determining unit 242 determines that the main body plug-in cannot interpret the additional print parameter.

If the first identification information matches the second identification information, the determining unit 242 further compares an additional print parameter contained in the JDL command with an additional print-parameter rule stored in the print-parameter rule storage unit 226 and, if the additional print parameter does not satisfy the additional print-parameter rule, the determining unit 242 determines that the main body plug-in cannot interpret the additional print parameter.

Conversely, if the additional print parameter satisfies the additional print-parameter rule, the determining unit 242 determines that the main body plug-in can interpret the additional print parameter. The determining unit 242 then updates the default value in the additional print-parameter table stored in the print-parameter table storage unit 228 using the variable for the additional print parameter.

In a similar manner, the determining unit 242 compares a standard print parameter contained in the JDL command with a standard print-parameter rule stored in the print-parameter rule storage unit 226 and, if the standard print parameter satisfies the standard print-parameter rule, the determining unit 242 determines that the control unit 240 can interpret the standard print parameter. The determining unit 242 then updates the default value in the standard print parameter table stored in the print-parameter table storage unit 228 using the variable for the standard print parameter.

The additional function unit 244 interprets an additional print parameter that is determined by the determining unit 242 as interpretable. Specifically, the additional function unit 244 interprets an additional print-parameter table stored in the print-parameter table storage unit 228. In the same manner, the control unit 240 interprets a standard print parameter that is determined by the determining unit 242 as interpretable. Specifically, the control unit 240 interprets a standard print parameter table stored in the print-parameter table storage unit 228.

The details of the updating unit 246 are described later.

If the determining unit 242 determines that the standard print parameter and the additional print parameter are interpretable, the print unit 250 prints image data, which is to be printed and contained in the JDL command, onto a recording sheet such as a transfer sheet in accordance with the interpreted standard print parameter and the interpreted additional print parameter. Specifically, the print unit 250 prints image data, which is to be printed and contained in the JDL command, onto a recording sheet such as a transfer sheet in accordance with the interpreted additional print-parameter table and the interpreted standard print parameter table.

If it is determined that the additional print parameter cannot be interpreted, the print unit 250 according to the present embodiment performs a particular operation other than printing of image data in accordance with the additional print parameter. Specifically, the print unit 250 cancels the printing of image data as a particular operation.

The display unit 260 displays a print progression and a print result of the printer 20 and can be implemented by an existing display device, such as a touch panel display or a liquid crystal display.

The operating unit 270 performs the input for various operations and can be implemented by an existing input device, such as a key switch or a touch panel. The display unit 260 and the operating unit 270 can be integrally implemented as a touch panel display, or the like.

The second storage unit 230 includes an identification-information storage unit 232 and an additional print-parameter rule storage unit 234.

The identification-information storage unit 232 stores therein second identification information on the installed main body plug-in. According to the present embodiment, because the function added by the main body plug-in is electronic watermarking, the identification-information storage unit 232 stores therein 1234 as second identification information.

The additional print-parameter rule storage unit 234 stores therein an additional print-parameter rule for the installed main body plug-in. According to the present embodiment, because the function added by the main body plug-in is electronic watermarking, the additional print-parameter rule storage unit 234 stores therein the additional print-parameter rule illustrated in FIG. 9.

If the main body plug-in is installed, the updating unit 246 stores the second identification information, which is stored in the identification-information storage unit 232 of the second storage unit 230, in the identification-information storage unit 224 of the first storage unit 222.

Further, if the main body plug-in is installed, the updating unit 246 stores the additional print-parameter rule, which is stored in the additional print-parameter rule storage unit 234 of the second storage unit 230, in the print-parameter rule storage unit 226 of the first storage unit 222.

The updating unit 246 stores the additional print-parameter table, in which additional key information of the additional print-parameter rule and the default value for the additional key information are linked to each other, in the print-parameter table storage unit 228 of the first storage unit 222.

The printer 20 does not need to include all of the above-described units as fundamental units, and a configuration may be such that the printer 20 does not include some of them.

Next, an explanation is given of an operation of the printer system that includes the printer according to the present embodiment.

Figure 10:
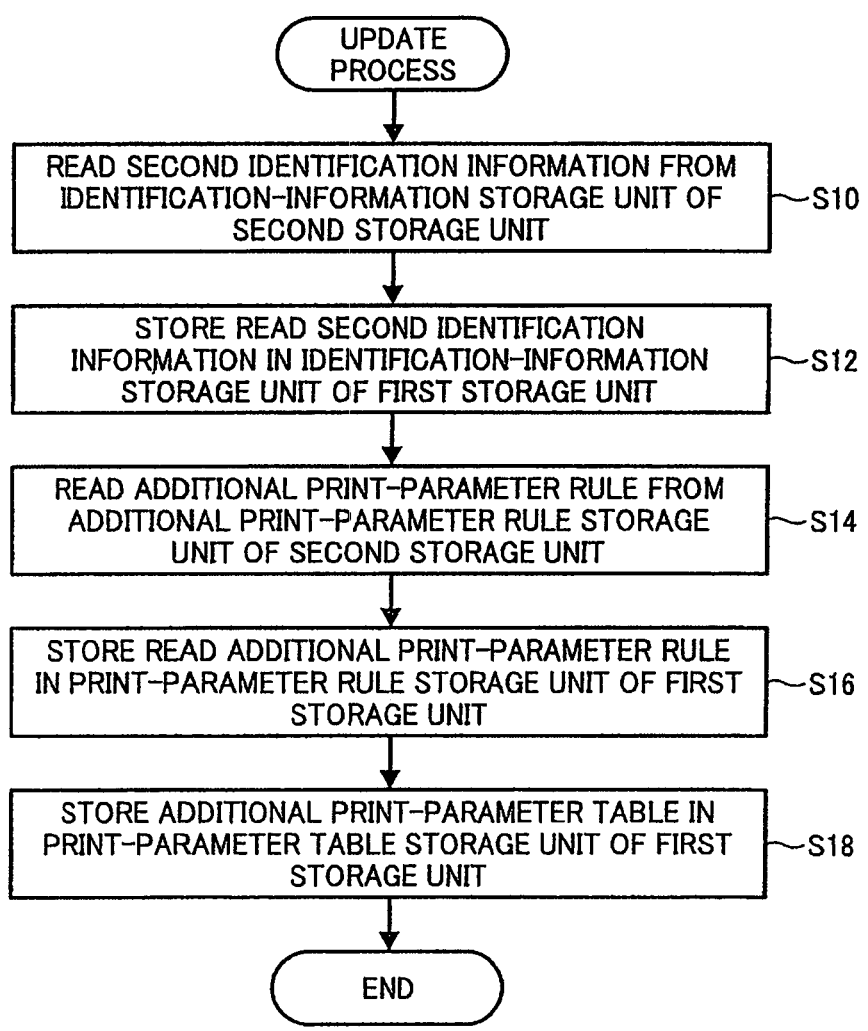
FIG. 10 is a flowchart that illustrates an example of the update process performed by the printer according to the present embodiment after the main body plug-in is installed.

FIG. 10 is a flowchart that illustrates an example of the procedure of the update process performed by the printer 20 according to the present embodiment after the main body plug-in is installed. Before the update process is performed, the identification-information storage unit 224 of the first storage unit 222 does not store any information, the print-parameter rule storage unit 226 of the first storage unit 222 stores therein only the standard print-parameter rule illustrated in FIG. 11, and the print-parameter table storage unit 228 of the first storage unit 222 stores therein only the standard print parameter table illustrated in FIG. 12.

First, the updating unit 246 reads the second identification information on the installed main body plug-in from the identification-information storage unit 232 of the second storage unit 230 (Step S10).

The updating unit 246 then stores the read second identification information in the identification-information storage unit 224 of the first storage unit 222 (Step S12). Thus, the second identification information, i.e., 1234, is stored in the identification-information storage unit 224.

The updating unit 246 then reads an additional print-parameter rule of the installed main body plug-in from the additional print-parameter rule storage unit 234 of the second storage unit 230 (Step S14).

The updating unit 246 then stores the read additional print-parameter rule in the print-parameter rule storage unit 226 of the first storage unit 222 (Step S16). Thus, the additional print-parameter rule illustrated in FIG. 9 is stored in the print-parameter rule storage unit 226, and the print parameter rule illustrated in FIG. 7 is stored in the print-parameter rule storage unit 226.

The updating unit 246 then stores the additional print-parameter table, in which additional key information of the read additional print-parameter rule and the default value for the additional key information are linked to each other, in the print-parameter table storage unit 228 of the first storage unit 222 (Step S18). Thus, the additional print-parameter table is stored in the print-parameter table storage unit 228, and the print parameter table illustrated in FIG. 8 is stored in the print-parameter table storage unit 228.

Figure 13:
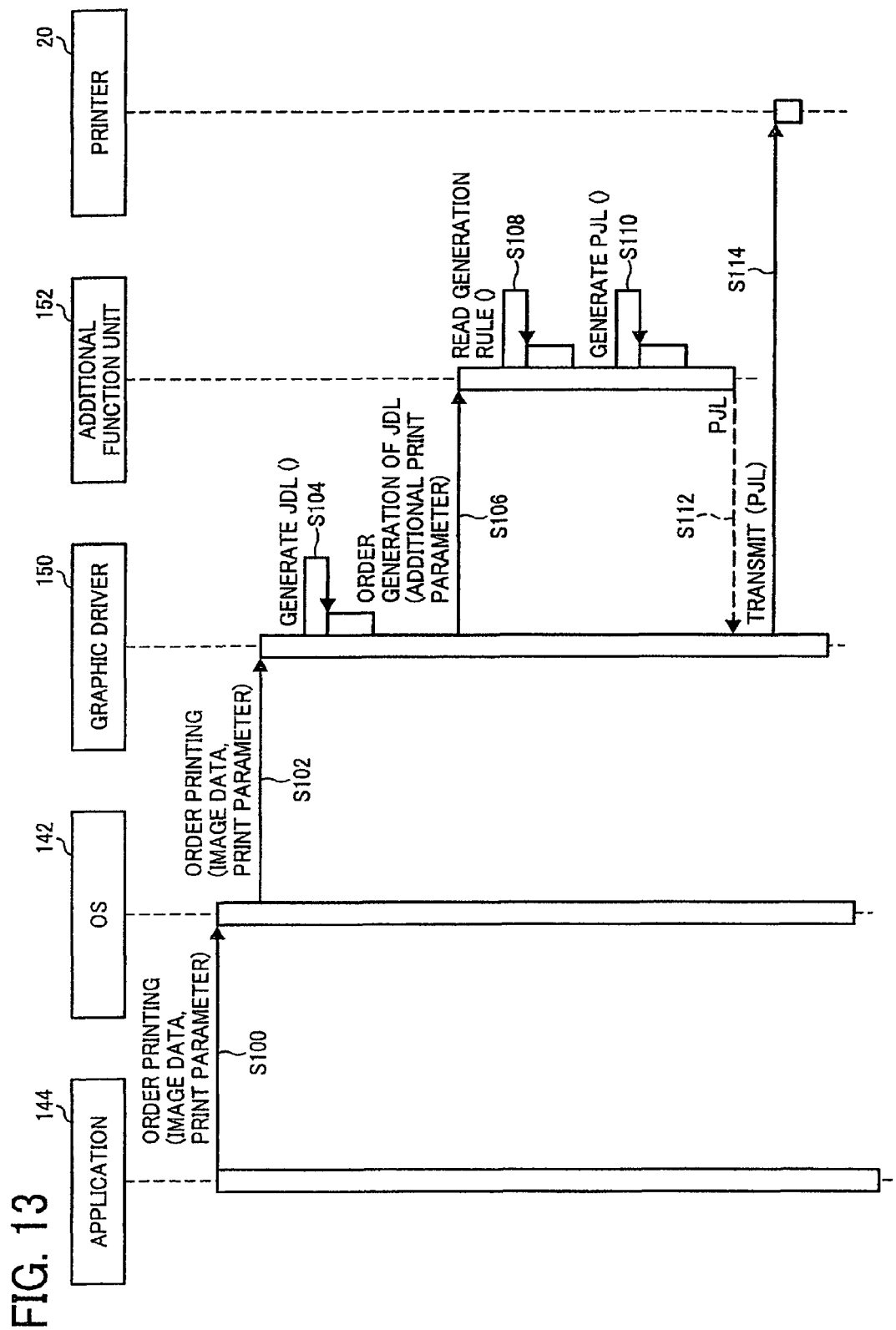
FIG. 13 is a sequence diagram that illustrates an example of the process performed by the PC according to the present embodiment when printing is performed.

FIG. 13 is a sequence diagram that illustrates an example of the procedure of the process performed by the PC 10 according to the present embodiment when printing is performed. The example illustrated in FIG. 13 is of a process after print settings are set by the UI driver 148 and print parameters are returned to the application 144.

First, the application 144 receives an operation input for ordering printing of image data from the operating unit 110 and notifies, using an Application Program Interface (API), the OS 142 of image data to be printed, of print parameters set by the UI driver 148, and the like, and also of a print order (Step S100).

The OS 142 then receives, from the application 144, the image data to be printed, the print parameters set by the UI driver 148, and the like, as well as the print order and notifies the graphic driver 150 of these using a Device Driver Interface (DDI) (Step S102).

The graphic driver 150 then receives the print order, and the like, from the application 144 and generates JDL commands for the image data to be printed and a standard print parameter included in the print parameters (Step S104.).

The graphic driver 150 then notifies the additional function unit 152 of an additional print parameter included in the print parameters as well as a generation order for a JDL command (Step S106).

The additional function unit 152 then receives the generation order for a JDL command, and the like, and reads a generation rule for the JDL command from the generation-rule storage unit 132 (Step S108).

The additional function unit 152 generates a JDL command in accordance with the additional print parameter notified by the graphic driver 150 and the generation rule (Step S110) and returns it to the graphic driver 150 (Step S112).

The graphic driver 150 then combines the JDL command generated by itself and the JDL command generated by the additional function unit 152 and causes the transmitting unit 160 to transmit the combined JDL command to the printer 20 (Step S114).

Figure 14:
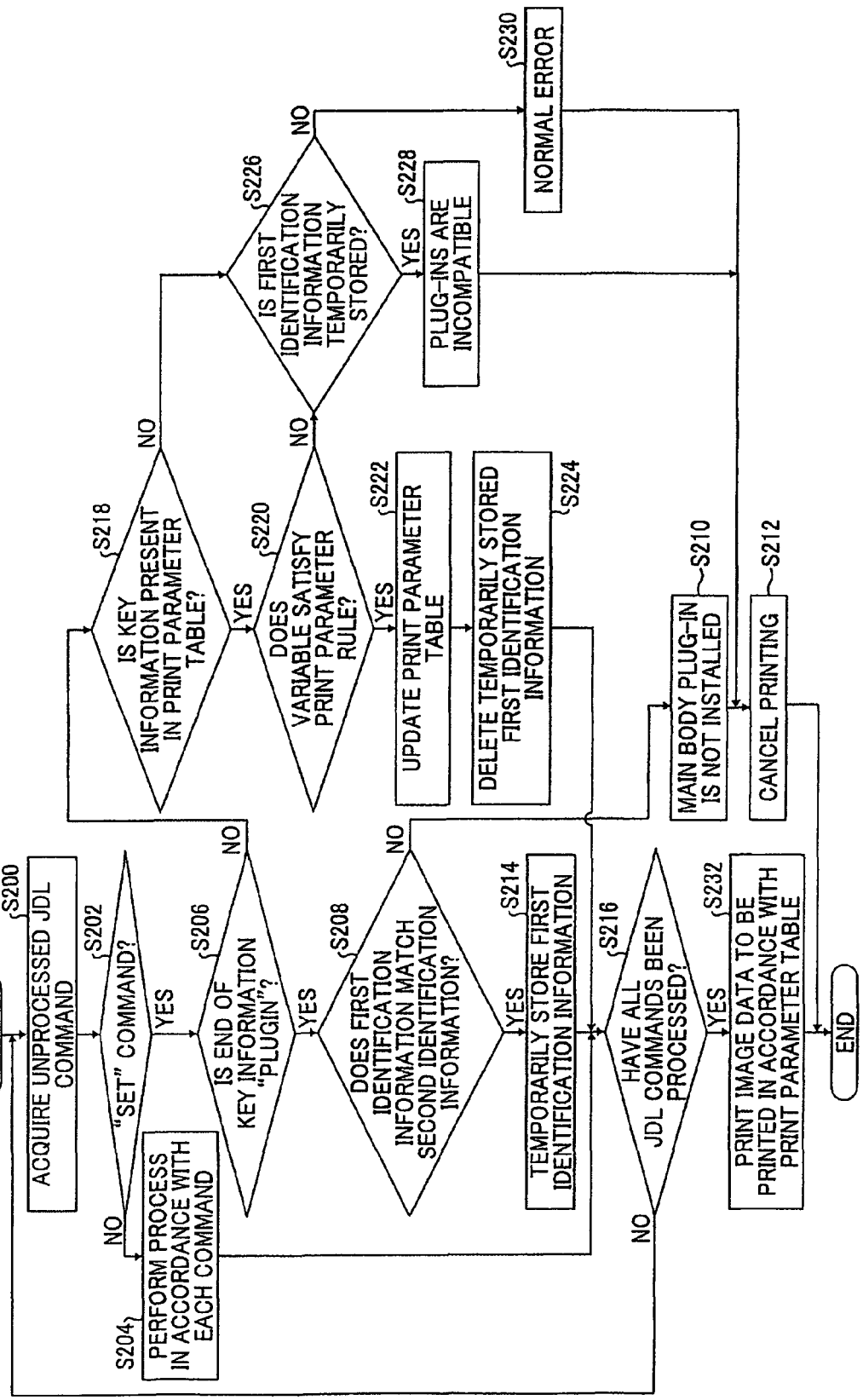
FIG. 14 is a flowchart that illustrates an example of the print process performed by the printer according to the present embodiment.

FIG. 14 is a flowchart that illustrates an example of the procedure of the print process performed by the printer 20 according to the present embodiment.

First, the determining unit 242 acquires an unprocessed JDL command from the JDL command group received by the receiving unit 210 (Step S200).

The determining unit 242 then checks whether the acquired JDL command is a "SET" command (Step S202).

If the acquired JDL command is not a "SET" command (No at Step S202), the determining unit 242 performs a process in accordance with each command (Step S204) and proceeds to Step S216.

Conversely, if the acquired JDL command is a "SET" command (Yes at Step S202), the determining unit 242 checks whether the end of key information is "PLUGIN" (Step S206).

If the end of the key information is "PLUGIN" (Yes at Step S206), the determining unit 242 determines whether the first identification information, which is the variable for the key information, matches the second identification information stored in the identification-information storage unit 224 (Step S208).

If the first identification information does not match the second identification information (No at Step S208), the determining unit 242 determines that the main body plug-in is not installed (Step S210), and the print unit 250 cancels the printing (Step S212).

Conversely, if the first identification information matches the second identification information (Yes at Step S208), the determining unit 242 temporarily stores the first identification information in the storage unit 220 (Step S214). According to the present embodiment, both the first identification information and the second identification information are 1234 and they match each other; therefore, the first identification information is temporarily stored in the storage unit 220.

The determining unit 242 then checks whether all of the JDL command group received by the receiving unit 210 has been processed (Step S216) and, if all of it has not been processed, proceeds to Step S200 (No at Step S216).

If the end of the key information is not "PLUGIN" at Step S206 (No at Step S206), the determining unit 242 checks whether the key information is present in the print parameter table stored in the print-parameter table storage unit 228 (Step S218).

If the key information is present in the print parameter table (Yes at Step S218), the determining unit 242 checks whether the variable for the key information satisfies the print parameter rule stored in the print-parameter rule storage unit 226 (Step S220).

If the variable for the key information satisfies the print parameter rule (Yes at Step S220), the determining unit 242 updates the default value for the key information in the print parameter table using the variable for the key information (Step S222), deletes the temporarily stored first identification information from the storage unit 220 (Step S224), and proceeds to Step S216. According to the present embodiment, as illustrated in FIG. 5, because the variable for WATERMARK, which is additional key information, is ON, the default value for WATERMARK in the print parameter table illustrated in FIG. 8 is updated to ON.

Conversely, if the key information is not present in the print parameter table (No at Step S218) or if the variable for the key information does not satisfy the print parameter rule (No at Step S220), the determining unit 242 checks whether the first identification information is temporarily stored in the storage unit 220 (Step S226).

If the first identification information is temporarily stored in the storage unit 220 (Yes at Step S226), the determining unit 242 determines that the main body plug-in is not compatible with the driver plug-in (Step S228), and the print unit 250 cancels the printing (Step S212). If the first identification information is not temporarily stored in the storage unit 220 (No at Step S226), the determining unit 242 determines that a normal error occurs (Step S230), and the print unit 250 cancels the printing (Step S212).

If the determining unit 242 determines that all of the JDL command group received by the receiving unit 210 has been processed at Step S216 (Yes at Step S216), the print unit 250 prints image data to be printed in accordance with the print parameter table (Step S232).

As described above, according to the present embodiment, the printer 20 receives, from the PC 10, the first identification information on the driver plug-in installed in the PC 10 and an additional print parameter as well as image data to be printed and compares them with the second identification information on the main body plug-in installed in the printer 20 and an additional print-parameter rule.

Thus, according to the present embodiment, the printer 20 can determine whether an additional print parameter received from the PC 10 is interpretable and, without performing two-way communication, check the compatibility between the main body plug-in installed in the printer 20 and the plug-in installed in the PC 10.

The PC 10 according to the present embodiment includes a control device such as a CPU, an internal storage device such as a Read Only Memory (ROM) or a RAM, an external storage device such as an HDD, an SSD, or a removable drive device, a display device such as a liquid crystal display, and an input device such as a keyboard or a mouse and has a hardware configuration using a generally used computer.

Figure 15:
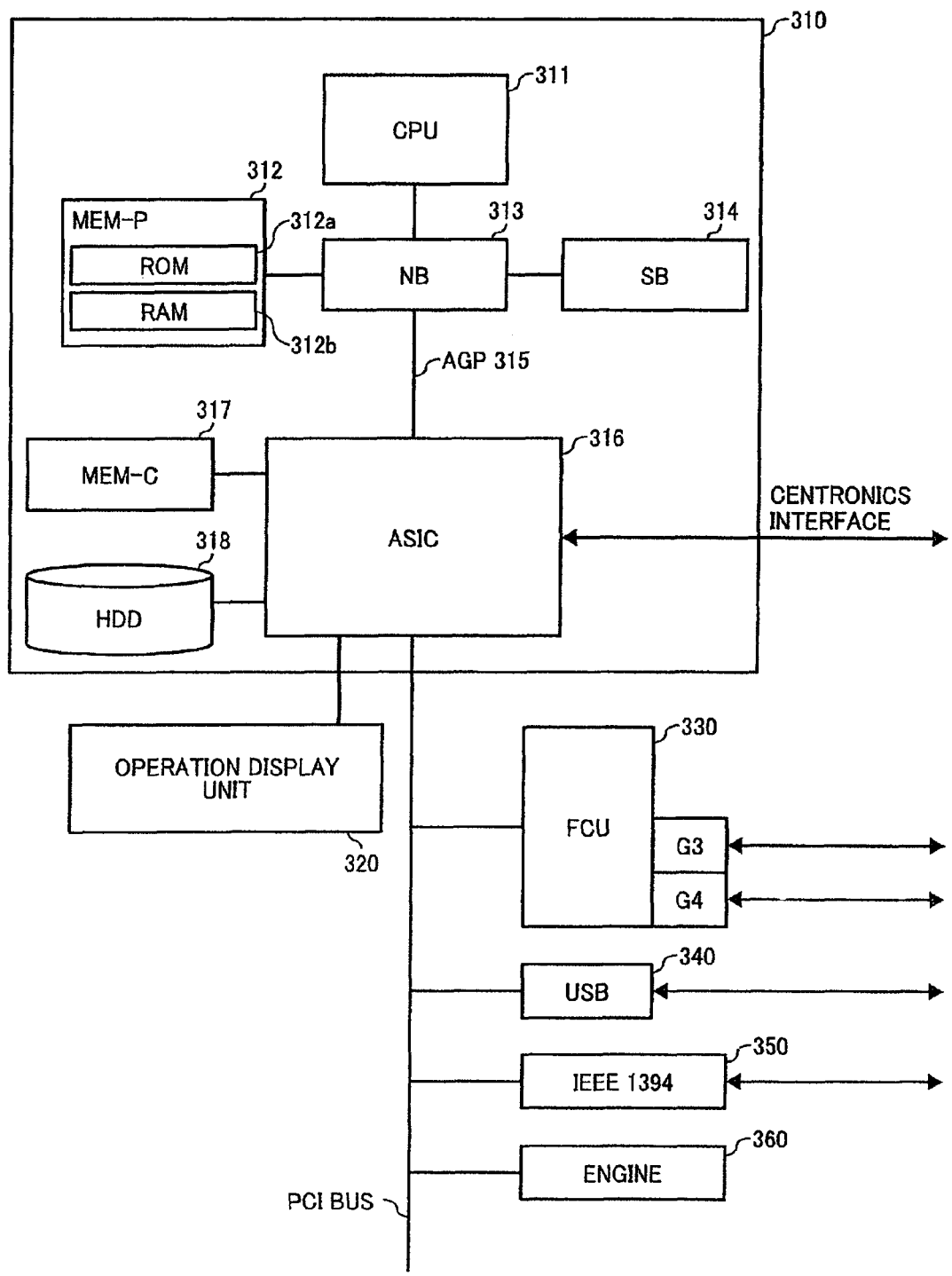
FIG. 15 is a block diagram that illustrates an example of the hardware configuration of the printer according to the present embodiment.

FIG. 15 is a block diagram that illustrates an example of the hardware configuration of the printer 20 according to the present embodiment.

As illustrated in FIG. 15, the printer 20 has a configuration in which a controller 310 and an engine unit (Engine) 360 are coupled to each other via a Peripheral Component Interconnect (PCI) bus. The controller 310 is a controller that controls the entire printer 20 and controls drawings, communication, and input from an operation display unit 320. The engine unit 360 is a printer engine, or the like, that is connectable to a PCI bus, for example, a black-and-white plotter, a one-drum color plotter, a four-drum color plotter, a scanner, a fax unit, or the like. The engine unit 360 includes an image processing section for error diffusion, gamma transformation, or the like, in addition to what is called an engine section such as a plotter.

The controller 310 includes a CPU 311, a north bridge (NB) 313, a system memory (MEM-P) 312, a south bridge (SB) 314, a local memory (MEM-C) 317, an Application Specific Integrated Circuit (ASIC) 316, and a hard disk drive (HDD) 318 and has a configuration in which the north bridge (NB) 313 is coupled to the ASIC 316 via an Accelerated Graphics Port (AGP) bus 315. The MEM-P 312 further includes a ROM 312a and a RAM 312b.

The CPU 311 performs overall control of the printer 20 and includes a chip set made up of the NB 313, the MEM-P 312, and the SB 314 so that the CPU 311 is coupled to other devices via the chip set.

The NB 313 is a bridge to connect the CPU 311, the MEM-P 312, the SB 314, and the AGP 315 and includes a memory controller that controls reading from and writing to the MEM-P 312, a PCI master, and an AGP target.

The MEM-P 312 is a system memory used as a memory for storing programs and data, a memory for loading programs and data, a memory for drawing by a printer, or the like, and includes the ROM 312a and the RAM 312b. The ROM 312a is a read-only memory used as a memory for storing programs and data, and the RAM 312b is a writable and readable memory used as a memory for loading programs and data, memory for drawing by a printer, or the like.

The SB 314 is a bridge to connect the NB 313, a PCI device, and a peripheral device. The SB 314 is coupled to the NB 313 via the PCI bus, and a network interface (I/F) unit, or the like, is also connected to the PCI bus.

The ASIC 316 is an Integrated Circuit (IC) intended for image processing that includes a hardware element for image processing, and has a function as a bridge to connect the AGP 315, the PCI bus, the HDD 318, and the MEM-C 317. The ASIC 316 is made up of a PCI target, an AGP master, an arbiter (ARB) that is the central core of the ASIC 316, a memory controller that controls the MEM-C 317, a plurality of Direct Memory Access Controllers (DMACs) that performs the rotation of image data, or the like, using hardware logic, and a PCI unit that performs data transfer with the engine unit 360 via the PCI bus. A Fax Control Unit (FCU) 330, a Universal Serial Bus (USB) 340, an IEEE 1394 (the Institute of Electrical and Electronics Engineers 1394) interface 350 are connected to the ASIC 316 via the PCI bus. The operation display unit 320 is directly connected to the ASIC 316.

The MEM-C 317 is a local memory used as a copy image buffer or a code buffer, and the HDD 318 is storage for storing image data, storing programs, storing font data, and storing forms.

The AGP 315 is a bus interface for a graphics accelerator card proposed for speeding up graphics processes and directly accesses the MEM-P 312 at a high throughput so that the speed of the graphics accelerator card is increased.

The present invention is not limited to the above-described embodiment, and various modifications can be made.

Although an explanation is given in the above-described embodiment using an operation of canceling the printing of image data as an example of the particular operation of the print unit 250, the particular operation is not limited thereto and may be an operation of printing image data without regard to an additional print parameter or an operation of suspending printing of image data.

If printing of image data is suspended as a particular operation, the print unit 250 receives, from the operating unit 270, an input of a selection operation for selecting whether image data is to be printed without regard to an additional print parameter or printing of image data is to be canceled and performs a particular operation in accordance with the input selection operation. At that time, the display unit 260 may display a selection screen.

Although the first identification information on the driver plug-in and the second identification information on the main body plug-in are compared with each other according to the above-described embodiment, version information on the driver plug-in and version information on the main body plug-in may be compared with each other in addition to the above.

At that time, if an additional print parameter received from the PC 10 is interpretable, the printer 20 prints image data to be printed using the additional print parameter; therefore, even if the version information on the driver plug-in does not match the version information on the main body plug-in, image data to be printed is printed using an additional print parameter. Specifically, the printer 20 prints image data to be printed using an additional print parameter received from the PC 10 if the additional print parameter can be interpreted by the main body plug-in, even if the version information on the main body plug-in is newer than or identical to the version information on the driver plug-in, and even if the version information on the driver plug-in is newer than the version information on the main body plug-in.

Thus, even if the versions of the driver plug-in and the main body plug-in do not completely match, image data to be printed can be printed using an additional print parameter; therefore, convenience for users can be improved.

According to the present invention, an advantage is produced such that the compatibility of plug-ins can be checked without performing two-way communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing apparatus comprising:
   a receiving unit that receives, from an information processing apparatus, a print command that includes image data to be printed, an additional print parameter that is a print parameter of a function added to a printer driver of the information processing apparatus by installing a first plug-in, and first identification information that is identification information on the first plug-in;
   an identification-information storage unit that stores therein second identification information that is identification information on an installed second plug-in;
   a determining unit that determines whether the second plug-in can interpret the additional print parameter by comparing the first identification information with the second identification information; and
   a print unit that, if it is determined that the additional print parameter cannot be interpreted, performs a particular operation other than printing of the image data in accordance with the additional print parameter;
   wherein, the additional print parameter including additional key information indicating an added function and a variable for the additional key information, further comprising a print-parameter rule storage unit that stores therein an additional print-parameter rule that defines the additional key information interpretable by the second plug-in and a possible value of the variable for the additional key information, wherein
   if the first identification information matches the second identification information, the determining unit further compares the additional print parameter with the additional print-parameter rule and, if the additional print parameter does not satisfy the additional print-parameter rule, determines that the second plug-in cannot interpret the additional print parameter.

2. The printing apparatus according to claim 1, wherein, if the second identification information that matches the first identification information is not present in the identification-information storage unit, the determining unit determines that the second plug-in cannot interpret the additional print parameter.

3. The printing apparatus according to claim 1, wherein the particular operation is any one of a first particular operation of printing the image data without regard to the additional print parameter, a second particular operation of suspending printing of the image data, and a third particular operation of canceling printing of the image data.

4. The printing apparatus according to claim 3, further comprising an operating unit that, if the second particular operation is performed, performs a selection operation to select whether the first particular operation or the third particular operation is to be performed, wherein
   the print unit performs a particular operation selected by the selection operation.

5. The printing apparatus according to claim 1, wherein
   the determining unit determines that the second plug-in can interpret the additional print parameter if the additional print parameter satisfies the additional print-parameter rule, and
   the print unit prints the image data in accordance with the additional print parameter if it is determined the additional print parameter is interpretable.

6. The printing apparatus according to claim 5, wherein
   the receiving unit receives the print command that further includes a standard print parameter that is a print parameter of a standard function of the printer driver of the information processing apparatus and includes standard key information indicating the standard function and a variable for the standard key information,
   the print-parameter rule storage unit further stores therein a standard print-parameter rule that defines the standard key information that is interpretable as a standard function and a possible value of the variable for the standard key information,
   the determining unit further compares the standard print parameter with the standard print-parameter rule and, if the standard print parameter satisfies the standard print-parameter rule, determines that the standard print parameter is interpretable, and
   if it is determined that the standard print parameter is interpretable, the print unit further prints the image data in accordance with the additional print parameter and the standard print parameter.

7. The printing apparatus according to claim 6, further comprising a print-parameter table storage unit that stores therein an additional print-parameter table in which the additional key information is linked to a default value for the additional key information and a standard print-parameter table in which the standard key information is linked to a default value for the standard key information, wherein if the determining unit determines that the second plug-in can interpret the additional print parameter, the determining unit updates the default value in the additional print-parameter table using the variable for the additional key information and, if the determining unit determines that the standard print parameter is interpretable, updates the default value in the standard print-parameter table using the variable for the standard key information, and the print unit prints the image data in accordance with the updated additional print-parameter table and the updated standard print-parameter table.

8. The printing apparatus according to claim 7, the additional print-parameter rule further defining the default value for the additional key information, further comprising an updating unit that stores the second identification information on the installed second plug-in in the identification-information storage unit, stores the additional print-parameter rule of the installed second plug-in in the print-parameter rule storage unit, and stores the additional print-parameter table in which the additional key information of the additional print-parameter rule is linked to the default value for the additional key information in the print-parameter table storage unit.

9. A printing method comprising:

receiving, by a receiving unit, from an information processing apparatus, a print command that includes image data to be printed, an additional print parameter that is a print parameter of a function added to a printer driver of the information processing apparatus by installing a first plug-in, and first identification information that is identification information on the first plug-in;

determining, by a determining unit, whether the second plug-in can interpret the additional print parameter by comparing the first identification information with second identification information that is identification information on an installed second plug-in and stored in an identification-information storage unit; and performing, by a print unit, a particular operation other than printing of the image data in accordance with the additional print parameter if it is determined that the additional print parameter cannot be interpreted;

wherein, the additional print parameter including additional key information indicating an added function and a variable for the additional key information, further comprising a print-parameter rule storage unit that stores therein an additional print-parameter rule that defines the additional key information interpretable by the second plug-in and a possible value of the variable for the additional key information, wherein if the first identification information matches the second identification information, the determining unit further compares the additional print parameter with the additional print-parameter rule and, if the additional print parameter does not satisfy the additional print-parameter rule, determines that the second plug-in cannot interpret the additional print parameter.

* * * * *